(12) United States Patent  
Maeda

(10) Patent No.: US 8,368,909 B2  
(45) Date of Patent: Feb. 5, 2013

(54) RECORDING MEDIUM, INFORMATION PROCESSING APPARATUS AND FUNCTION SIMULATION METHOD OF IMAGE PROCESSING APPARATUS

(75) Inventor: Toshihiro Maeda, Sakai (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 325 days.

(21) Appl. No.: 12/880,391

(22) Filed: Sep. 13, 2010

(65) Prior Publication Data

US 2011/0063646 A1    Mar. 17, 2011

(30) Foreign Application Priority Data

Sep. 16, 2009   (JP) ................................. 2009-215052

(51) Int. Cl.
*G06F 15/00* (2006.01)
*G06F 3/12* (2006.01)
*G06K 1/00* (2006.01)

(52) U.S. Cl. ..................................... 358/1.13; 358/1.15

(58) Field of Classification Search ......................... None
See application file for complete search history.

(56) References Cited

U.S. PATENT DOCUMENTS

| | | | |
|---|---|---|---|
| 6,513,058 B2 * | 1/2003 | Brown et al. ................. | 709/201 |
| 6,581,002 B2 | 6/2003 | Ugajin | |
| 2005/0066324 A1 | 3/2005 | Delgado et al. | |
| 2006/0101522 A1 | 5/2006 | Rothwell et al. | |
| 2007/0147928 A1 | 6/2007 | Oyumi et al. | |
| 2008/0244057 A1 | 10/2008 | Kojima | |

FOREIGN PATENT DOCUMENTS

| | | |
|---|---|---|
| JP | 2001-216286 | 8/2001 |
| JP | 2005-100401 A | 4/2005 |
| JP | 2007-179262 | 7/2007 |
| JP | 2008-282062 | 11/2008 |

OTHER PUBLICATIONS

Search Report dated Dec. 21, 2010, issued in the corresponding European Application No. 10175958.7-2211.
Notification of Reasons for Refusal issued Oct. 4, 2011, in corresponding Japanese Patent Application No. 2009-215052, and English translation thereof.
Office Action (Notification of Reasons for Refusal) dated Jul. 12, 2011 issued in the corresponding Japanese Patent Application No. 2009-215052, and an English Translation thereof.

* cited by examiner

*Primary Examiner* — Douglas Tran
(74) *Attorney, Agent, or Firm* — Buchanan Ingersoll & Rooney PC

(57) ABSTRACT

A computer readable recording medium has a simulation program installed on an information processing apparatus to allow the information processing apparatus to simulate one or more than one function of an image processing apparatus. The simulation program includes: an actual process library that allows the information processing apparatus to simulate one or more than one function of the image processing apparatus, by making the information processing apparatus execute processing just like the image processing apparatus, according to a command from an application program that is installed on the information processing apparatus to make the image processing apparatus execute processing; and a virtual process library that allows the information processing apparatus to simulate one or more than one function of the image processing apparatus, not by making the information processing apparatus execute processing just like the image processing apparatus, according to a command from the application program.

10 Claims, 5 Drawing Sheets

| Customer Level | Library | Copy Permission | Replacement Permission | Permitted Number of Times of Use | Expiration Date | Virtual Lib |
|---|---|---|---|---|---|---|
| Platinum | A | ○ | ○ | ∞ | ∞ | A'.dll |
| Gold | B | × | × | 10 | 08/12/31 | B'.dll |
| Silver | C | × | ○ | 20 | 09/3/31 | C'.dll |
| ... | ... | ... | ... | ... | ... | ... |

RECORDING MEDIUM, INFORMATION PROCESSING APPARATUS AND FUNCTION SIMULATION METHOD OF IMAGE PROCESSING APPARATUS

This application claims priority under 35 U.S.C. §119 to Japanese Patent Application No. 2009-215052 filed on Sep. 16, 2009, the entire disclosure of which is incorporated herein by reference in its entirety.

BACKGROUND OF THE INVENTION

1. Field of the Invention

The present invention relates to: a computer readable recording medium having a function simulation program installed on an information processing apparatus to allow the information processing apparatus to simulate one or more than one function of an image processing apparatus; the information processing apparatus having a function simulation program installed thereon to simulate one or more than one function of the image processing apparatus; and a simulation method of a function of the image processing apparatus, implemented by the information processing apparatus.

2. Description of the Related Art

The following description sets forth the inventor's knowledge of related art and problems therein and should not be construed as an admission of knowledge in the prior art.

Conventionally, specifically in recent years, users have come to use the scan function, the print function, the facsimile function and other functions of a MFP (Multi Function Peripheral) that is a multifunctional digital image forming apparatus or an image processing apparatus such as a printer, a scanner and a facsimile, operating from an information processing apparatus such as a personal computer, by connecting the information processing apparatus to the MFP or the image processing apparatus, via a network.

Users can use a function of the image processing apparatus operating from the information processing apparatus as described above, because the information processing apparatus transmits commands to the image processing apparatus according to an application program installed on the information processing apparatus. Thus, in order to improve the convenience and usability of users who hope to use a function of the image processing apparatus, it is necessary to enhance or newly develop an application program to install on the information processing apparatus to make the image processing apparatus execute processing.

Engineers or persons who try to enhance or newly develop an application program in a development company, have to perform operation check of image processing apparatuses using the application program, and unless the customer who try to enhance or newly develop an application program is a manufacturer of image processing apparatus, actually it would be not easy or would be rather inefficient for the customer to obtain some image processing apparatuses for operation check.

To prevent such a trouble, manufacturers usually develop by their selves a simulation program to allow information processing apparatuses to simulate a function of their image processing apparatuses, and provide it to customers, so that the customers could install this provided simulation program on their own information processing apparatuses. Thus, according to commands from an application program to make an image processing apparatus execute processing, the simulation program makes the information processing apparatuses execute processing as if the information processing apparatuses could use a function of the image processing apparatus.

Meanwhile, the simulation program may include a program that makes the information processing apparatuses execute a process that requires the customers to be granted a license, or should be kept from the customers if they are not reliable very much. However, it has been inconvenient and left unsolved that once obtaining the simulation program, all the customers come to be able to execute the simulation program, even if some of them are not granted a license or not reliable very much.

To resolve this, as disclosed in Japanese Unexamined Laid-open Patent Publication No. 2005-100401, there is a technology to provide a software product to be installed on image processing apparatuses, including various packages for the product and other versions of the product, and determine which package or version (which program) to install thereon, according to a product key entered for installation.

Although the technology disclosed in the Patent Publication above resolves the inconvenience that any customers can execute a simulation program without limitation even if they are not granted a license or not reliable very much, it is not good that customers cannot use some programs because those are not installed on their information processing apparatuses. With the shortage of programs, it would be hard to enhance or develop an application program to make image processing apparatuses execute processing, which is another inconvenience.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a computer readable recording medium having a function simulation program recorded therein, which is capable of resolving the inconvenience that any customers can execute the simulation program without limitation even if they are not granted a license or not reliable very much, and also capable of resolving the inconvenience that enhancement or development of an application program to make an image processing apparatus execute processing, is hard because some programs are not installed on information processing apparatuses.

It is another object of the present invention to provide an information processing apparatus that is capable of resolving the inconvenience that any customers can execute a simulation program without limitation even if they are not granted a license or not reliable very much, and also capable of resolving the inconvenience that enhancement or development of an application program to make an image processing apparatus execute processing, is hard because some programs are not installed on information processing apparatuses.

It is yet another object of the present invention to provide a method of simulating a function of an image processing apparatus, implemented by the information processing apparatus.

According to a first aspect of the present invention, a computer readable recording medium has a simulation program installed on an information processing apparatus to allow the information processing apparatus to simulate one or more than one function of an image processing apparatus, comprising:

an actual process library that allows the information processing apparatus to simulate one or more than one function of the image processing apparatus, by making the information processing apparatus execute processing just like the image processing apparatus, according to a command from an application program that is installed on the information processing apparatus to make the image processing apparatus execute processing; and a virtual process library that allows the information processing apparatus to simulate one or more than one function of the image processing apparatus, not by making the information processing apparatus execute processing just like the image processing apparatus, according to a command from the application program, and wherein:

the actual process library or the virtual process library, whichever can allow the information processing apparatus to simulate one or more than one function of the image processing apparatus.

According to a second aspect of the present invention, an information processing apparatus comprises:

an installer that installs thereon a simulation program including:

an actual process library that allows the information processing apparatus to simulate one or more than one function of an image processing apparatus by making the information processing apparatus execute processing just like the image processing apparatus, according to a command from an application program that is installed on the information processing apparatus to make the image processing apparatus execute processing; and a virtual process library that allows the information processing apparatus to simulate one or more than one function of the image processing apparatus, not by making the information processing apparatus execute processing just like the image processing apparatus, according to a command from the application program; and a simulator that simulate one or more than one function of the image processing apparatus, according to the actual process library or the virtual process library.

According to a third aspect of the present invention, a method of simulating a function of an image processing apparatus, implemented by an information processing apparatus, comprises:

installing an actual process library that allows the information processing apparatus to simulate one or more than one function of the image processing apparatus, by making the information processing apparatus execute processing just like the image processing apparatus, according to a command from an application program that is installed on the information processing apparatus to make the image processing apparatus execute processing, and also installing a virtual process library that allows the information processing apparatus to simulate one or more than one function of the image processing apparatus, not by making the information processing apparatus execute processing just like the image processing apparatus, according to a command from the application program; and simulating one or more than one function of the image processing apparatus according to the actual process library or the virtual process library, whichever.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a view showing a use range table; and

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
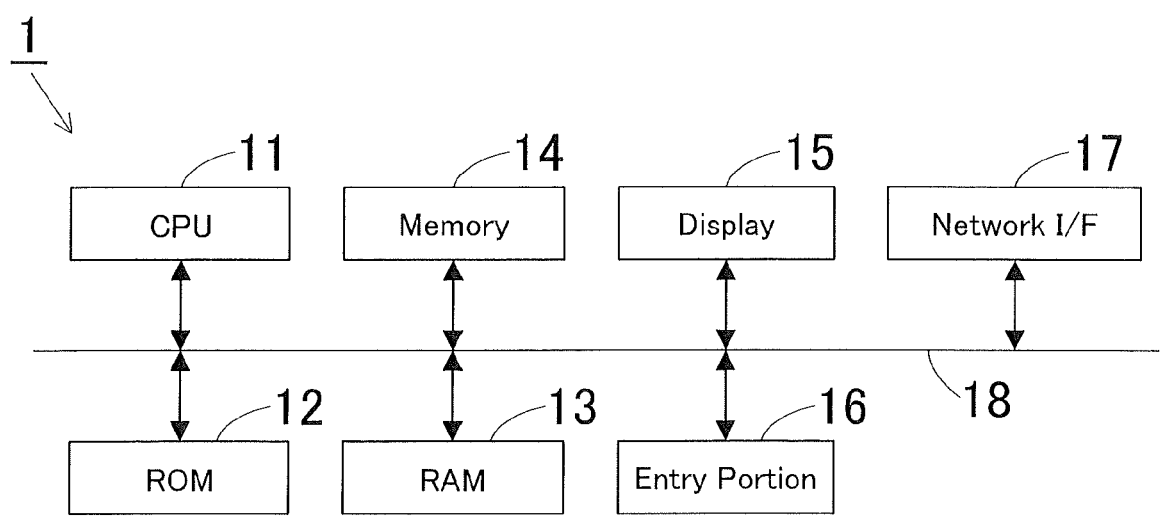
FIG. 1 is a view showing a configuration of an information processing apparatus according to one embodiment of the present invention.

FIG. 1 is a view showing a configuration of an information processing apparatus 1 according to one embodiment of the present invention. The information processing apparatus 1 is a personal computer. The information processing apparatus 1 serves to develop an application program for an mage processing apparatus not shown in Figure and perform operation check thereof, so that the information processing apparatus 1 can make the image processing apparatus execute processing in a predetermined manner by transmitting commands thereto.

The information processing apparatus 1 includes a CPU 11, a ROM 12, a RAM 13, a memory 14, a display 15, an entry manipulator 16, a network interface (network I/F) 17 and etc.

The CPU 11 centrally controls the entire information processing apparatus 1, by executing a program recorded in the ROM 12 or the memory 14. Specifically, in this embodiment, the CPU 11 executes a simulation program to allow the information processing apparatus 1 to simulate one or more than one function of an image processing apparatus.

The image processing apparatus is not necessarily limited to a specific type. For example, a copier, a printer, a scanner, a facsimile (FAX), a MFP collectively having a plurality of functions such as the copy function, the print function, the scan (document reading) function and the facsimile function, or other types of image processing apparatuses may be employed as the image processing apparatus 1. In this embodiment, the simulation program serves to allow the information processing apparatus 1 to simulate a function of the MFP. Also, the function of the image processing apparatus, simulated by the information processing apparatus 1, is not necessarily limited to a specific one. It may be the scan function, the print function, the FAX function, the communication function, the GUI (Graphical User Interface) display function or other functions, and its number may be one or more than one.

The ROM 12 is a recording medium that records in itself a program executed by the CPU 11, and other data.

The RAM 13 is a recording medium that provides a work area for the CPU 11 to execute processing according to an operation program.

The memory 14 is a recording medium such as a hard disk drive, and records in itself an application program to make the MFP execute processing as described above, a simulation program, and other data.

The display 15 is a CRT, a liquid crystal display or etc., and displays on itself various messages, screens and other information.

The entry manipulator 16 is used by users for entry manipulation, and includes a keyboard, a mouse and etc.

The network interface 17 functions as a communicator that exchanges data with external devices such as image processing apparatuses, via a network.

Figure 2:
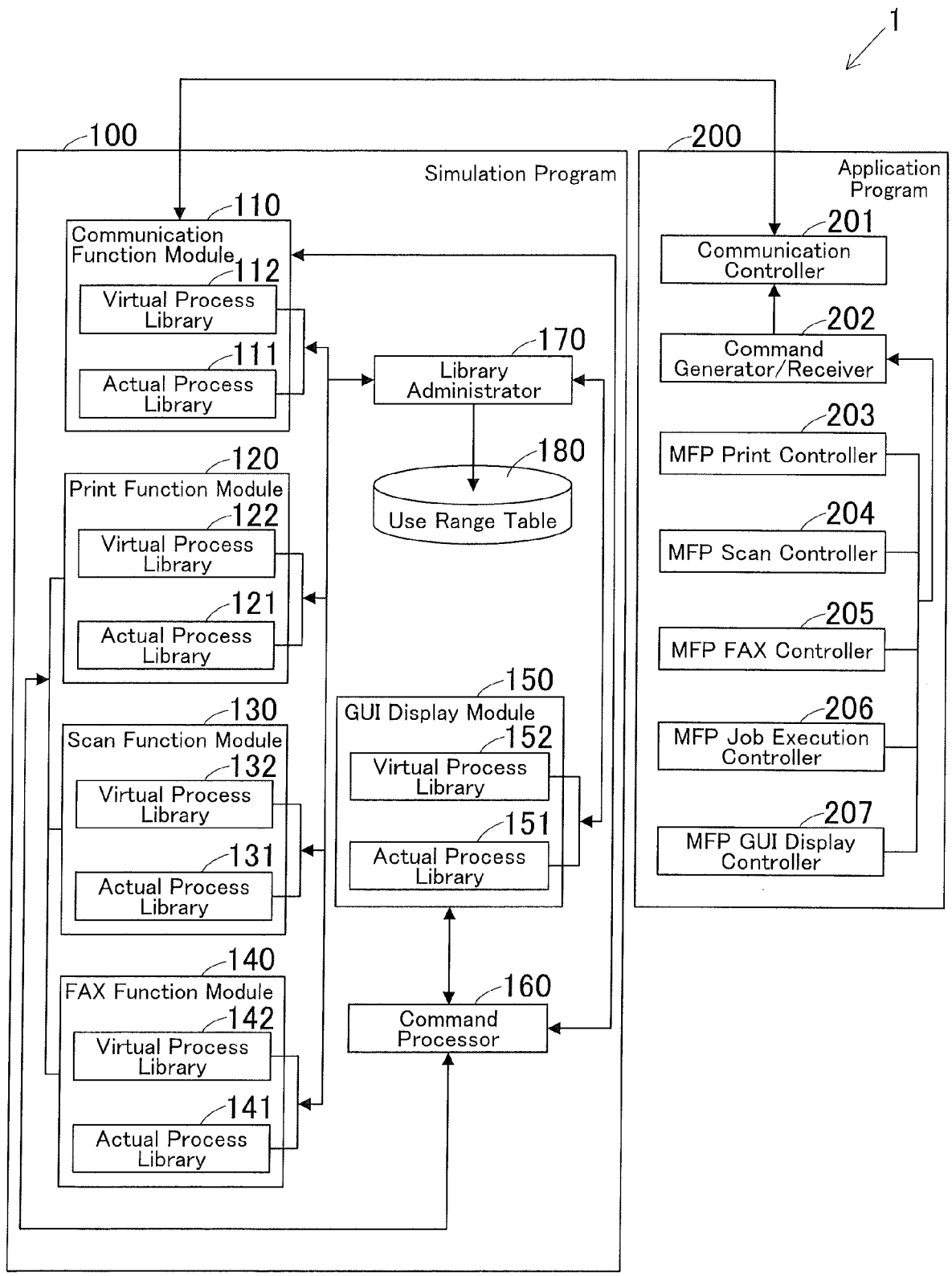
FIG. 2 is a view to explain the whole picture of a configuration of a simulation program installed on an information processing apparatus.

FIG. 2 is a view to explain the whole picture of a configuration of a simulation program installed on the information processing apparatus 1.

A simulation program 100 includes a communication function module 110 that is a program allowing the information processing apparatus 1 to simulate the communication function of the MFP; a print function module 120 that is a program allowing the information processing apparatus 1 to simulate the print function thereof; a scan function module 130 that is a program allowing the information processing apparatus 1 to simulate the scan function thereof; a FAX function module 140 that is a program allowing the information processing apparatus 1 to simulate the FAX function thereof; and a GUI display function module 150 that is a program allowing the information processing apparatus to simulate the GUI display function thereof.

Each of the function modules holds an actual process library and a virtual process library. In other words, the communication function module 110 holds an actual process library 111 and a virtual process library 112, the print function module 120 holds an actual process library 121 and a virtual process library 122, the scan function module 130 holds an actual process library 131 and a virtual process library 132, the FAX function module 140 holds an actual process library 141 and a virtual process library 142, and the GUI display function module 150 holds an actual process library 151 and a virtual process library 152.

Receiving commands from an application program 200 installed on the information processing apparatus 1 to make the MFP execute processing, the actual process libraries 111, 121, 131, 141 and 151 make the information processing apparatus 1 execute processing just like the MFP, and thus the information processing apparatus 1 come to be able to simulate the functions of the MFP. These actual process libraries 111, 121, 131, 141 and 151 also include a program to make the information processing apparatus 1 execute a process that requires a license or confidentiality.

Meanwhile, the virtual process libraries 112, 122, 132, 142 and 152 share a common interface with their matching actual process libraries 111, 121, 131, 141 and 151, respectively. And receiving commands from the application program 200 installed on the information processing apparatus, the virtual process libraries 112, 122, 132, 142 and 152 make the information processing apparatus 1 execute processing, and thus the information processing apparatus 1 come to be able to simulate the functions of the MFP. However, these do not make the information processing apparatus 1 execute processing just like the MFP without limitation, but prohibit the information processing apparatus 1 from executing a process that requires a license or confidentiality and make the information processing apparatus 1 execute an alternate process that would never cause a problem even when provided to customers not reliable very much.

Here, the actual process libraries 111, 121, 131, 141 and 151 and the virtual process libraries 112, 122, 132, 142 and 152 are provided to allow the information processing apparatus 1 to simulate a plurality of functions. Alternatively, an actual process library and a virtual process library may be provided to allow it to simulate at least one function, or a plurality of different versions of actual process libraries and a plurality of their matching virtual process libraries may be provided to allow it to simulate just for one single function.

In this embodiment, the simulation program 100 also includes a command processor 160, a library administrator 170 and a use range table 180.

The command processor 160 analyzes a command received from the application program 200 installed on the information processing apparatus 1, and transmits a command to the function module 110, 120, 130, 140 or 150 suitable for a process required by the received command.

The library administrator 170 administers the use range table 180. Also, the library administrator 170 determines based on the use range table 180, whether an actual process library or a virtual process library to use for executing a process required by a command that the command processor 160 transmits to a predetermined function module, and also controls the function module according to the determined process library. The use range table 180 will be later described in detail.

From a functional point of view, the application program 200 installed on the information processing apparatus 1 to make the MFP execute processing consists of a communication controller 201, a command generator/receiver 202, MFP printer controller 203, a MFP scan controller 204, a MFP FAX controller 205, a MFP job execution controller 206 and a MFP GUI display controller 207. The command generator/receiver 202 generates a command to give to the simulation program 100, based on an instruction from the controllers, then transmits the generated command to the simulation program 100 via the communication controller 201.

Figure 3:
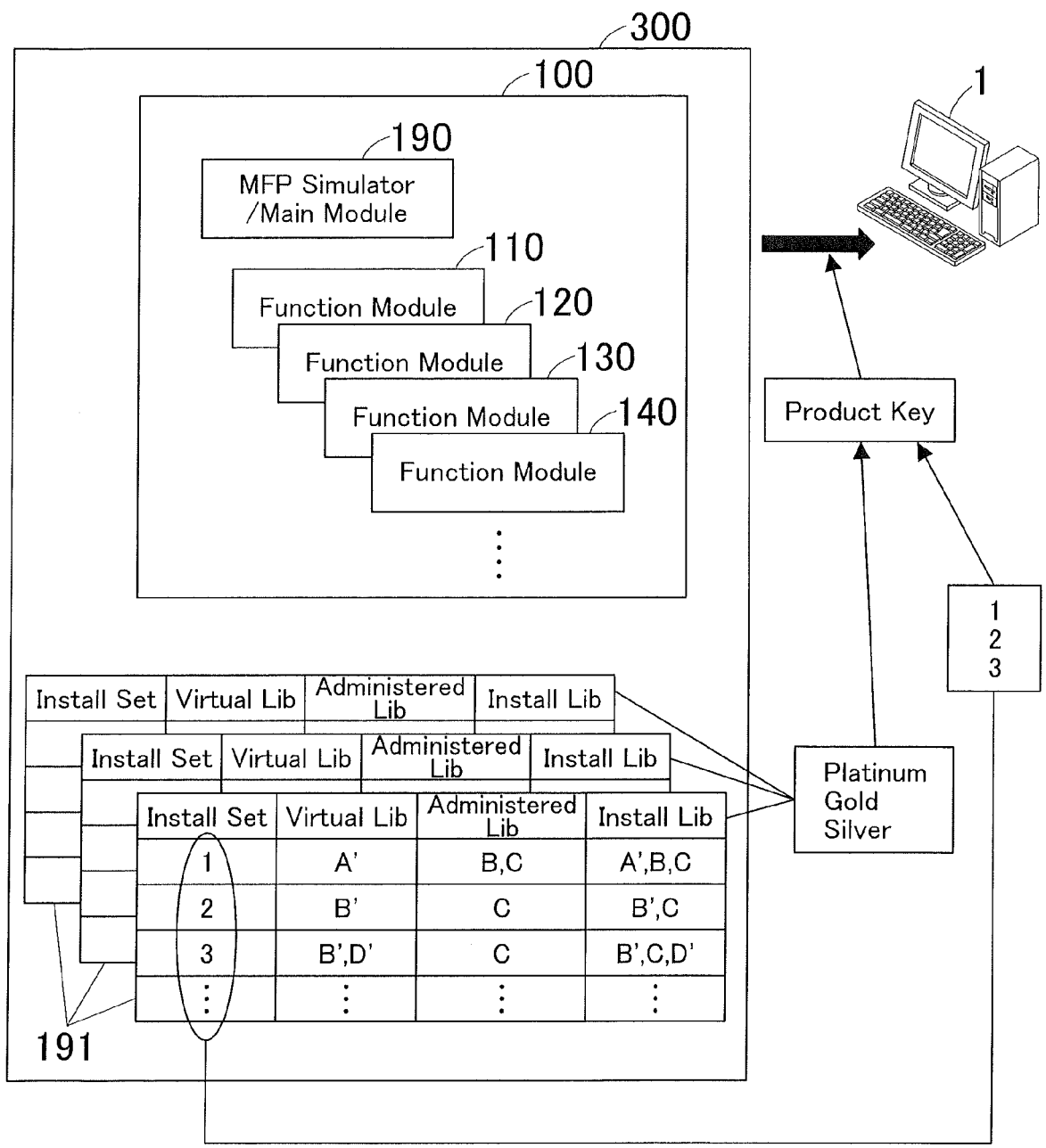
FIG. 3 is a view to explain an operation to install a simulation program on the information processing apparatus.

FIG. 3 is a view to explain a procedure to install the simulation program 100 on the information processing apparatus 1.

The simulation program 100 is provided to customers, for example via CD-ROM, DVD-ROM or another recording medium 300, and installed on their own information processing apparatus 1. Alternatively, it may be downloaded from a server via a network, and installed thereon.

The recording medium 300 holds the communication function module 110, the print function module 120, the scan function module 130, the FAX function module 140, the GUI display module 150 and other function modules allowing the information processing apparatus 1 to simulate the functions of the MFP, as described above. And the recording medium 300 also holds a main module 190 that installs a necessary function module with a coalition of the information processing apparatus 1 and creates the use range table 180 in the information processing apparatus 1. The function modules 110, 120, 130, 140 and 150 include the actual process modules 111, 121, 131, 141 and 151 and the virtual process modules 112, 122, 132, 142 and 152, respectively.

Furthermore, the recording medium 300 also holds an administration table 191. The administration table 191 holds the actual process libraries 111, 121, 131, 141 and 151 and/or the virtual process libraries 112, 122, 132, 142 and 152 of the function modules 110, 120, 130, 140 and 150, classified in advance in a plurality of groups, in order to facilitate installation of the actual process libraries 111, 121, 131, 141 and 151 and/or the virtual process libraries 112, 122, 132, 142 and 152 suitable for a customer.

Concretely, in this embodiment, the administration table 191 holds data classified into the three customer groups: "Platinum", "Gold" and "Silver", depending on the reliability of customers (also referred to as "customer levels"), and data in each of the customer groups is further classified into the three set groups (referred to as "Install Set" in FIG. 3): "1", "2" and "3".

And a certain combination of an actual process library and a virtual process library to be installed on the information processing apparatus 1 is determined in advance for data in each of the set groups of each of the customer groups.

For example, as shown in FIG. 3, for the set group "1" of the customer group "Silver", the virtual process library (referred to as "Virtual Lib" in this Figure) A' of the function module a, the actual process library (referred to as "Administered Lib" in this Figure) B of the function module b, and the actual process library C of the function module c, are determined in advance to be installed on the information processing apparatus 1 (referred to as "Install Lib" in this Figure).

Also, for example, for the set group "2" of the customer group "Silver", the virtual process library B' of the function module b and the actual process library C of the function module c, are determined in advance to be installed thereon.

Also, for example, for the set group "3" of the customer group "Silver", the virtual process library B' of the function module b, the virtual process library D' of the function module d, and the actual process library C of the function module c, are determined in advance to be installed thereon.

When the recording medium 300 like described above is connected to the information processing apparatus 1, the CPU 11 starts installation. Subsequently, an operator enters in the information processing apparatus 1, a product key specified in advance by a program provider, which depends on the level of a customer or etc., then a library to be installed thereon, determined in advance for a set group of a customer group is selected from the administration table 191, based on the entered product key. And the selected library is read out from a necessary function module and installed on the information processing apparatus 1. Meanwhile, the use range table 180 like shown in FIG. 4 is created in the information processing apparatus 1.

As described above, based on an entered product key and the administration table 191 holding the actual process libraries 111, 121, 131, 141 and 151 and/or the virtual process libraries 112, 122, 132, 142 and 152, classified in advance in a plurality of groups, a predetermined combination of an actual process library and/or a virtual process library is installed on the information processing apparatus 1. And thus, it becomes easier to install an actual process library and/or a virtual process library suitable for a customer.

Hereinafter, the use range table 180 will be explained with reference to FIG. 4.

This use range table 180 holds the use ranges of the actual process libraries 111, 121, 131, 141 and 151, and this table is created for each customer level (customer group). Once the simulation program 100 is installed on the information processing apparatus 1, the use range table 180 is created therein for a customer level indicated by a product key.

In this embodiment, "Copy Permission", "Replacement Permission", "Permitted Number of Times of Use" and "Expiration Date" are the items to determine the use range.

"Copy Permission" is the item indicating whether or not the actual process library is permitted to be copied, which is checked out when the customer hopes to use the simulation program 100 operating another information processing apparatus 1. "○" means that copy is permitted, and "x" means that copy is not permitted.

"Replacement Permission" is the item indicating whether or not the actual process library is permitted to be replaced to a different one and used. "○" means that replacement is permitted, and "x" means that the replacement is not permitted.

"Permitted Number of Times of Use" is the item indicating how many times the actual process library is permitted to be used. "Expiration Date" is the item indicating when the actual process library is expired.

For example, a simulation program is installed for a customer classified as the customer group "Silver". In this case, as for the actual process library A, copy is permitted, replacement is permitted, the number of times of use is not limited, and there is no expiration date. As for the actual process library B, copy is not permitted, replacement is not permitted, the number of times of use is limited to 10, and it is expired on Dec. 31, 2008. As for the actual process library C, copy is not permitted, replacement is permitted, the number of times of use is limited to 20, and it is expired on Mar. 31, 2009.

The use range table 180 is updated at each use of these actual process libraries. For example, once an actual process library is used, the value in the item "Permitted Number of Times of Use" is reduced by one.

In this embodiment, if an actual process library is installed on an information processing apparatus, its matching virtual process library is also installed thereon at the same time. Then, the use range table 180 is created in the information processing apparatus 1, and also information that is the file name and the storage location of the virtual process library is recorded therein at the same time.

And every time when the simulation program 100 installed on the information processing apparatus 1 is activated, it is judged based on the use range table 180, whether or not the actual process library 111, 121, 131, 141 or 151 installed thereon is permitted to be used. And if the actual process library is permitted to be used, the actual process library is activated, meanwhile if the actual process library is not permitted to be used, the virtual process library 112, 122, 132, 142 or 152 is activated.

Figure 5:
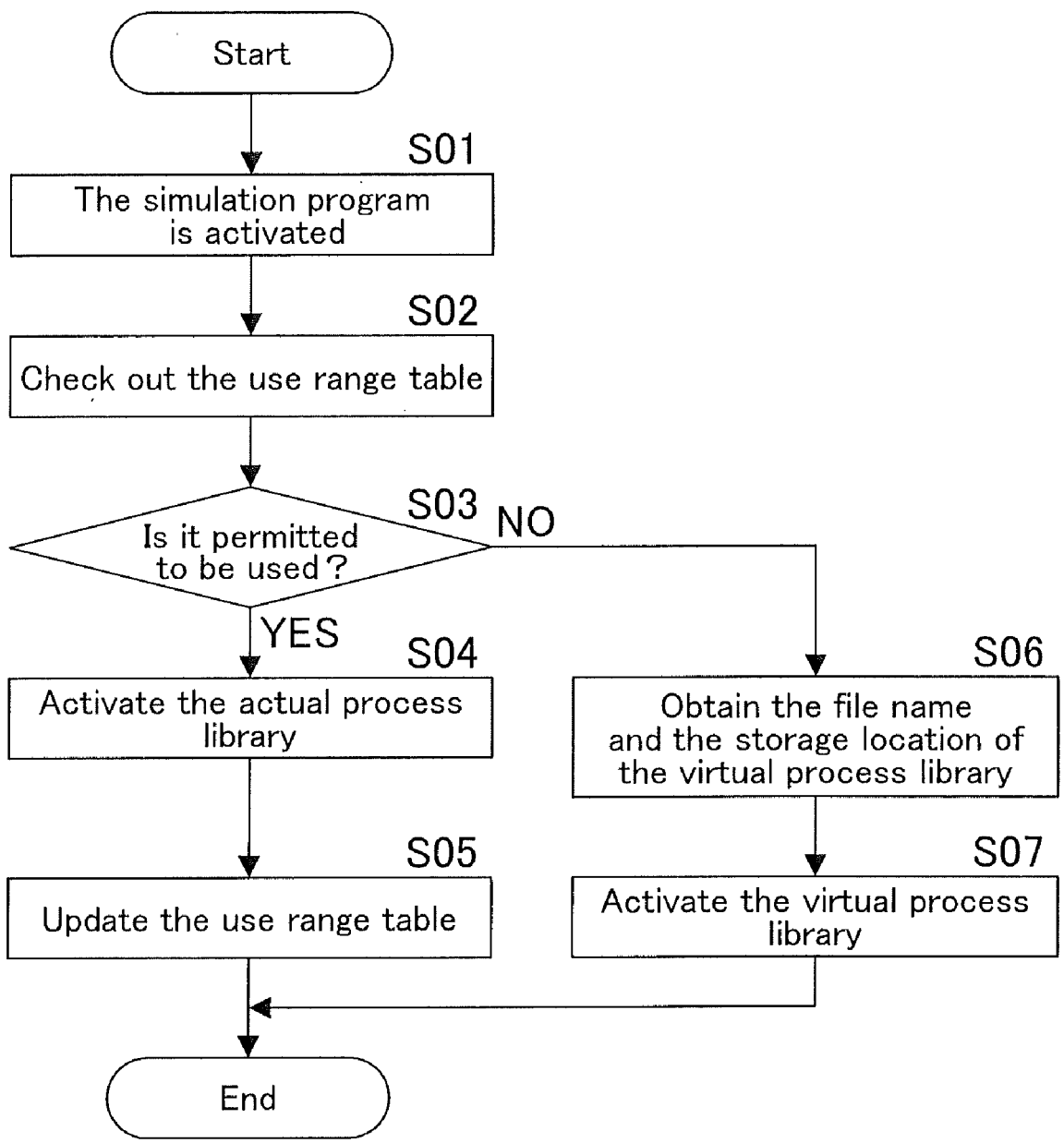
FIG. 5 is a flowchart showing a procedure executed by a CPU of the information processing apparatus when a simulation program installed on the information processing apparatus is activated.

FIG. 5 is a flowchart representing a procedure executed by the CPU 11 of the information processing apparatus 1, when the simulation program 100 installed on the information processing apparatus 1 is activated.

In Step S01, the simulation program 100 is activated. Then, the use range table 180 is checked out in Step S02, and it is judged in Step S03, whether or not the actual process library is permitted to be used.

If it is permitted to be used (YES in Step S03), the actual process library 111, 121, 131, 141 or 151 is activated in Step S04. After that, the use range table 180 is updated in Step S05.

If it is not permitted to be used (NO in Step S04), information that is the file name and the storage location of the virtual process library 112, 122, 132, 142 or 152 matching the actual process library 111, 121, 131, 141 or 151, is obtained in Step S06. After that, the virtual process library stored in the obtained storage location is activated in Step S07.

As described above, in this embodiment, when the simulation program 100 is installed on the information processing apparatus 1, the use range table 180 holding the predetermined use ranges of the actual process library 111, 121, 131, 141 and 151 is created in the information processing apparatus 1. And when the simulation program 100 is activated, it is judged based on the use range table 180, whether or not the actual process library 111, 121, 131, 141 or 151 is permitted to be used. And if the actual process library 111, 121, 131, 141 or 151 is permitted to be used, it is activated, meanwhile, if the actual process library 111, 121, 131, 141 or 151 is not permitted to be used, the virtual process library 112, 122, 132, 142 or 152 is activated. Therefore, customers not reliable very much can be prohibited more effectively, from using actual process libraries without limitation or with the intention of abuse.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A non-transitory computer readable recording medium having a function simulation program installed on an information processing apparatus to allow the information processing apparatus to simulate one or more than one function of an image processing apparatus, wherein the simulation program comprises:
    an actual process library that allows the information processing apparatus to simulate one or more than one function of the image processing apparatus, by making the information processing apparatus execute processing just like the image processing apparatus, according to a command from an application program that is installed on the information processing apparatus to make the image processing apparatus execute processing; and
    a virtual process library that allows the information processing apparatus to simulate a function corresponding to one or more than one function of the image processing apparatus, by making the information processing apparatus execute alternate processing which is different from that of the image processing apparatus using the actual process library, according to a command from the application program,
the function simulation program to be installed thereon to allow further executing:
    selecting either or both of the actual process library and the virtual process library about every function of the image processing apparatus, depending on the customer who uses the function simulation program; and
    installing the selected library on the information processing apparatus.

2. The non-transitory computer readable recording medium as recited in claim 1, wherein:
    the image processing apparatus has a plurality of functions, and the simulation program includes an actual process library and a virtual process library about each of the functions; and
    some of the actual process libraries and/or the virtual process libraries included in the simulation program are installed on the information processing apparatus.

3. The non-transitory computer readable recording medium as recited in claim 2, wherein:
    there is a table containing multiple groups of either or both of the actual process library and the virtual process library; and
    one of the multiple groups of either or both of the actual process library and the virtual process library is selected from the table depending on the customer who uses the function simulation program, so that it can be installed on the information processing apparatus.

4. The non-transitory computer readable recording medium as recited in claim 1, wherein there is a use range table defining the use range of the actual process library about every customer, making the information processing apparatus execute:
    creating a personal use range table for the customer who uses the function simulation program, based on the use range table when the simulation program is installed on the information processing apparatus;
    judging based on the personal use range table created, whether or not a target actual process library is permitted to be used, at the time of activation after installation; and
    activating the target actual process library if it is judged that the target actual process library is permitted to be used or activating a suitable virtual process library if it is judged that the target actual process library is not permitted to be used.

5. The non-transitory computer readable recording medium as recited in claim 4, wherein the use range table includes at least one of the following items: permission or prohibition to copy the actual process library; number of times the actual process library is allowed to be used; and expiration date of the actual process library.

6. An information processing apparatus comprising:
   a selecting portion that selects either or both of:
   an actual process library that allows the information processing apparatus to simulate one or more than one function of an image processing apparatus, by making the information processing apparatus execute processing just like the image processing apparatus, according to a command from an application program that is installed on the information processing apparatus to make the image processing apparatus execute processing; and
   a virtual process library that allows the information processing apparatus to simulate a function corresponding to one or more than one function of the image processing apparatus, by making the information processing apparatus execute alternate processing which is different from that of the image processing apparatus using the actual process library, according to a command from the application program,
   about every function of the image processing apparatus depending on the customer who uses a function simulation program comprising the actual process library and the virtual process library;
   an installer that installs the selected library on the information processing apparatus according to the simulation program; and
   a simulator that simulate one or more than one function of the image processing apparatus, according to the library installed on the information processing apparatus.

7. The information processing apparatus as recited in claim 6, wherein:
   the image processing apparatus has a plurality of functions, and the simulation program includes an actual process library and a virtual process library for each of the functions; and
   the installer installs some of the actual process libraries and/or the virtual process libraries included in the simulation program, on the information processing apparatus.

8. The information processing apparatus as recited in claim 7, wherein:
   there is a table containing multiple groups of either or both of the actual process library and the virtual process library; and
   the selecting portion selects one of the multiple groups of either or both of the actual process library and the virtual process library from the table depending on the customer who uses the function simulation program, so that it can be installed on the information processing apparatus.

9. The information processing apparatus as recited in claim 6, wherein there is a use range table defining the use range of the actual process library about every customer,
   the information processing apparatus further comprising:
   a creator that creates a personal use range table for the customer who uses the function simulation program, based on the use range table when the simulation program is installed on the information processing apparatus;
   a judgment portion that judges based on the personal use range table created by the creator, whether or not a target actual process library is permitted to be used, at the time of activation after installation; and
   a program activator that activates the target actual process library if the judgment portion judges that the target actual process library is permitted to be used or activates a suitable virtual process library if the judgment portion judges that the target actual process library is not permitted to be used.

10. The information processing apparatus as recited in claim 9, wherein the use range table includes at least one of the following items: permission or prohibition to copy the actual process library; number of times the actual process library is allowed to be used; and expiration date of the actual process library.

* * * * *